US010045432B1

(12) United States Patent
Medvedev

(10) Patent No.: US 10,045,432 B1
(45) Date of Patent: Aug. 7, 2018

(54) SYSTEM AND METHOD OF LOW-POWER PLASMA GENERATION BASED ON HIGH-VOLTAGE PLASMATRON

(71) Applicant: DM ECO Plasma, Inc., Fort Worth, TX (US)

(72) Inventor: Dmitry Medvedev, Fort Worth, TX (US)

(73) Assignee: DM ECO Plasma, Inc., Fort Worth, TX (US)

( * ) Notice: Subject to any disclaimer, the term of this patent is extended or adjusted under 35 U.S.C. 154(b) by 0 days.

(21) Appl. No.: 15/789,291

(22) Filed: Oct. 20, 2017

(51) Int. Cl.
*H05H 1/34* (2006.01)
*H05H 1/26* (2006.01)
*B23K 10/00* (2006.01)
*B23K 10/02* (2006.01)

(52) U.S. Cl.
CPC ....... *H05H 1/34* (2013.01); *H05H 2001/3431* (2013.01)

(58) Field of Classification Search
CPC . H05H 1/34; H05H 1/26; B23K 10/00; B23K 10/02
USPC ........................................................ 315/357
See application file for complete search history.

(56) References Cited

U.S. PATENT DOCUMENTS

| | | | | |
|---|---|---|---|---|
| 2009/0065485 A1* | 3/2009 | O'Neill | H05H 1/46 | 219/121.52 |
| 2012/0143183 A1* | 6/2012 | Suslov | H05H 1/34 | 606/45 |
| 2012/0143184 A1* | 6/2012 | Suslov | H05H 1/34 | 606/45 |
| 2015/0305132 A1* | 10/2015 | Mitra | H05H 1/48 | 313/231.31 |
| 2017/0311432 A1* | 10/2017 | Eckert | H05H 1/34 | |

FOREIGN PATENT DOCUMENTS

| | | | |
|---|---|---|---|
| EP | 2557902 A2 * | 2/2013 | H05H 1/34 |

* cited by examiner

*Primary Examiner* — Dylan White
(74) *Attorney, Agent, or Firm* — Bardmesser Law Group

(57) ABSTRACT

A plasma generation system includes an anode having a generally cylindrical proximal portion and a generally cylindrical distal portion, the distal portion having a smaller diameter than the first portion; a connecting portion connecting the first and second portions and having walls oriented at approximately 45 degrees to center axis of the anode; a cathode having a generally cylindrical shape in its proximal portion and a tapering at approximately a 30 degree angle to the center axis of the anode in its distal portion, where a gap between the connecting portion of the anode and the distal portion of the cathode is at least twice as large as a gap between the proximal portion of the anode and the proximal portion of the cathode; and a high voltage power supply providing an operating voltage in a range of 800-2500 volts and a current of about 0.3-0.7 A to the cathode.

8 Claims, 9 Drawing Sheets

CONVENTIONAL ART

SYSTEM AND METHOD OF LOW-POWER PLASMA GENERATION BASED ON HIGH-VOLTAGE PLASMATRON

BACKGROUND OF THE INVENTION

Field of the Invention

This invention relates to high-voltage plasmatrons that are utilized as a portable air cooled device, such as those that may be used for production of materials for biomedical uses, fiber manufacturing, surfaces treatment and laboratory purposes.

Description of the Related Art

Arc plasmatron is one of popular and practically usable methods of thermal plasma generation used for different applications such as metal cutting, waste utilization, small scale chemical production and others, where a high-temperature plasma torch can be used. A power region of conventional arc plasmatrons is 1-1000 kW, and design of electrodes should provide proper electrodes' cooling conditions to prevent the electrodes from overheating and deterioration. A traditional solution is to use a liquid cooling system. Nevertheless, electrodes' lifetime of conventional plasmatrons is limited, and electrodes of the plasmatron (especially cathode) are frequently replaced.

Recently, new applications of plasmatrons appeared which do not require such high power and torch temperature as did conventional arc plasmatrons. These new applications are related to surface treatment not only by utilizing high temperature, but also using other active agents generated by plasma: UV radiation, active molecules generated from initial gas blowing through plasmatron, active particles including excited molecules and radicals, etc. New applications of such plasma generators can be found in different industries: microelectronics, synthetic fiber manufacturing and modification, and medicine and laboratory use.

Using traditional designs of plasmatrons for new applications is not convenient because of such features as liquid cooling of electrodes and limitation on electrodes' lifetime, which dramatically decreases the reliability, the operation time, and the compactness of system. These features also increase operation costs and, therefore, can make new small scale applications practically impossible.

A conventionally designed plasmatron has similar dimensions and power region to the new high voltage low current plasmatron but works at a relatively high current and low voltage. For example, in this case working voltage is 160 V, current of 5 A and power of 800 W. This plasmatron has been developed for an ignition system. It has no liquid cooling systems and has a working time about 30 sec. After this short time, electrodes start overheating and the plasmatron needs time for cooling down. Total operation time of such devices is only about 50 hours. It cannot be used for tasks that need long operation time. Accordingly, there is a need in the art for a plasmatron design that addresses these problems.

SUMMARY OF THE INVENTION

Accordingly, the present invention is directed to a low current high voltage plasmatron that substantially obviates one or more of the disadvantages of the related art.

In one aspect of the invention, a plasma generation system includes an anode having a generally cylindrical proximal portion and a generally cylindrical distal portion, the distal portion having a smaller diameter than the first portion; a connecting portion connecting the first and second portions and having walls oriented at approximately 45 degrees to a center axis of the anode; a cathode having a generally cylindrical shape in its proximal portion and a tapering at approximately a 30 degree angle to the center axis of the anode in its distal portion, where a gap between the connecting portion of the anode and the distal portion of the cathode is at least twice as large as a gap between the proximal portion of the anode and the proximal portion of the cathode; and a high voltage power supply providing an operating voltage in a range of 800-2500 volts and a current of about 0.3-0.7 A to the cathode. Optionally, the anode and the cathode are coaxial. Optionally, the cathode is movable along the center axis. Optionally, a screw is used for moving the cathode along the center axis. Optionally, both the cathode and the anode are made from stainless steel, or the cathode is made of copper with a hafnium tip, or only the anode is made of stainless steel, or the cathode is made of stainless steel with a hafnium tip.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
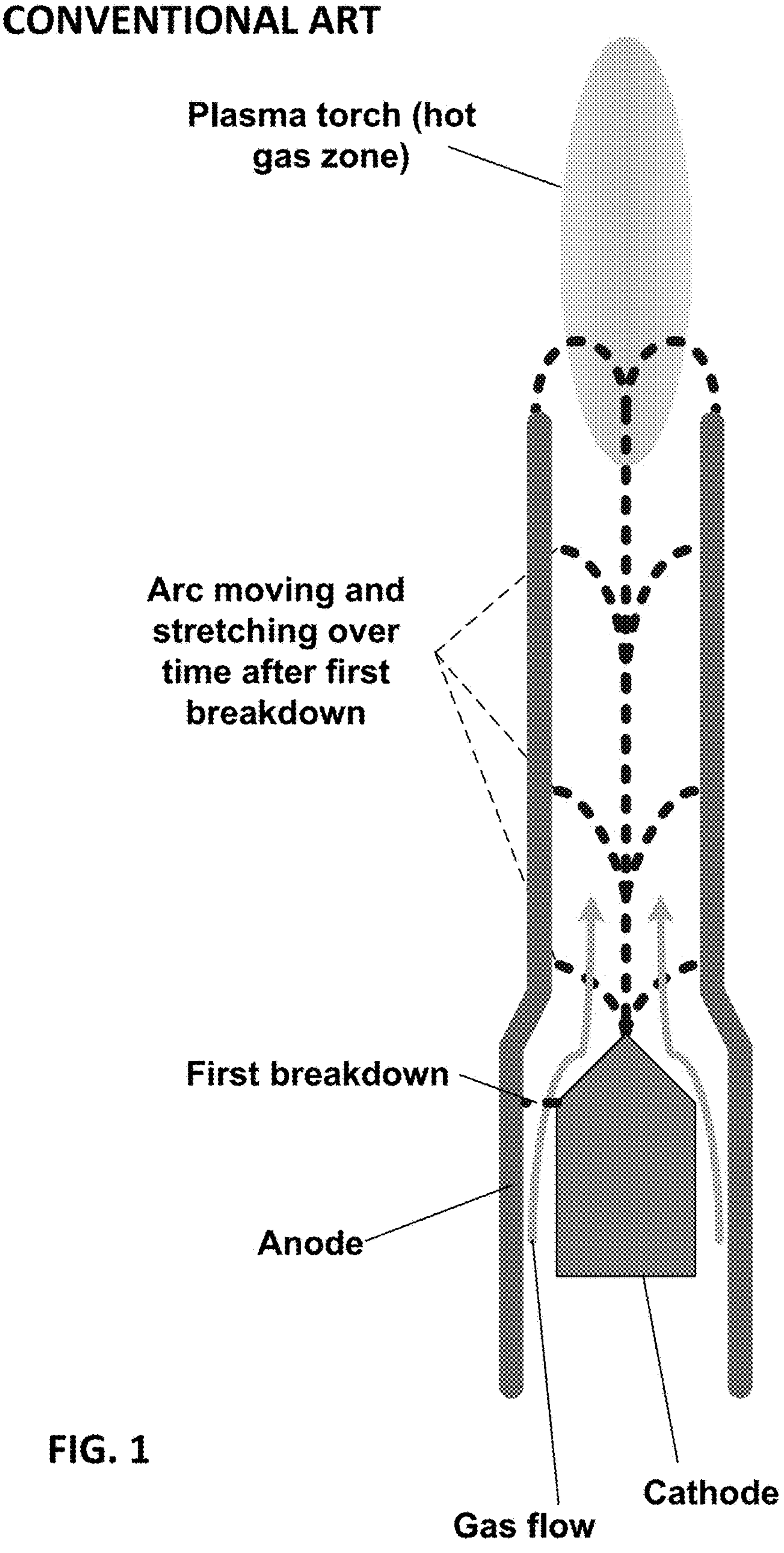
FIG. 1 illustrates development of arc filament in a conventional plasmatron channel after a first breakdown, when the arc is moved and stretched by the gas flow.

To address the problems and the disadvantages of the conventional art, a new plasmatron type with completely different electric characteristics has been developed. The heating of electrodes and subsequent electrodes' erosion problems are caused by electric current. Significant part of total power dissipated in the plasmatron is dissipated in electrode layers extremely close to electrodes' surface and cause electrodes' heating. This power is not used properly and will not go into plasma torch heating. The energy losses which go into electrodes' heating are proportional to the electric current and decrease if we decrease the current. To keep total power at the same level we need to increase the voltage proportionally to the current decrease. From theoretical point of view this is possible because voltage of electric arc current drops with the increase of current and grows with current decreasing but this dependence is slower then proportional. To decrease the current and to keep the power at the same time we need to change power supply volt-ampere characteristic and plasmatron electrodes to stimulate new operation mode with low current and high voltage. To understand the idea we need to consider factors which determine established average arc voltage after first breakdown and stretching of arc filaments in gas flow. A conventional plasmatron is shown in FIG. 1.

After first breakdown in the narrow gap the arc filament start moving in gas flow and stretch more and more. While increasing the arc length the voltage also increases. As a result several stable arc behavior modes are possible.

Figure 2:
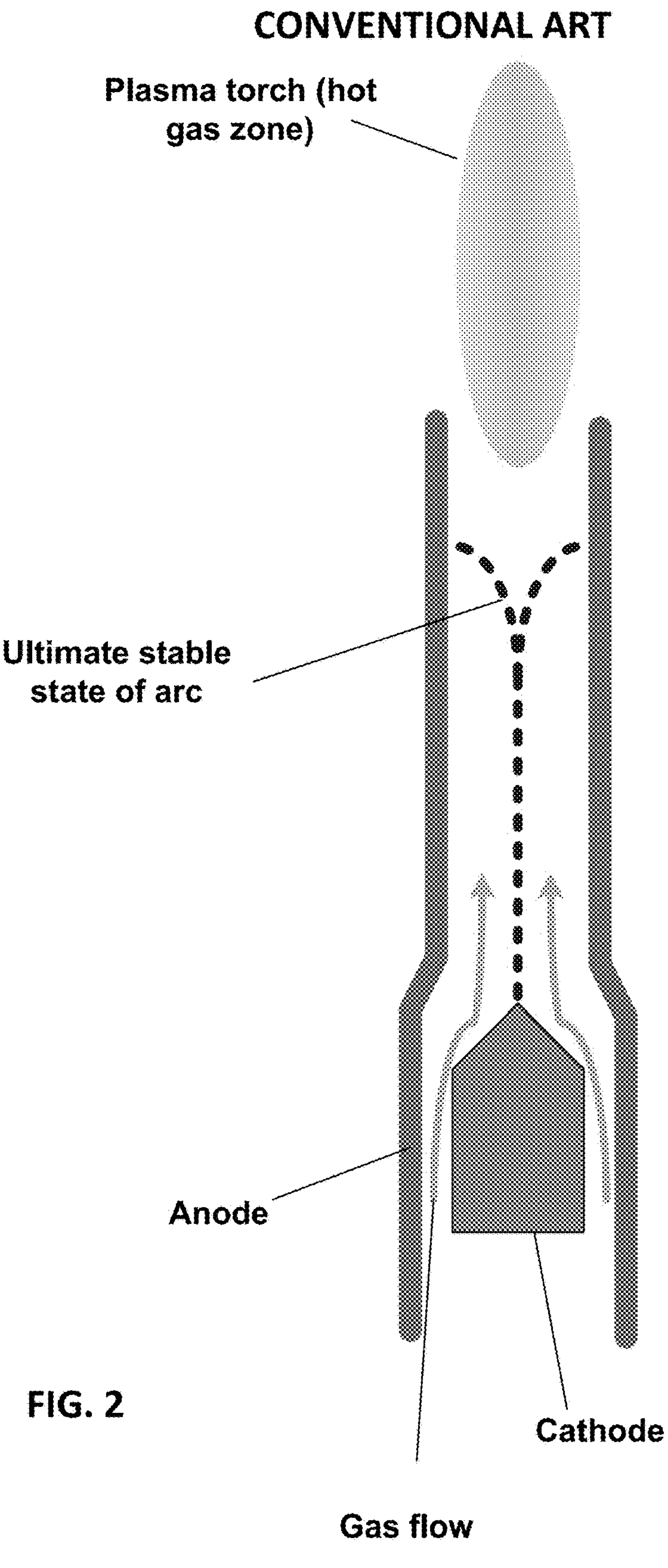
FIG. 2 illustrates an ultimate state of arc filament in plasmatron channel typical for conventional plasmatrons.

(1) The arc can stretch up to the final length corresponding to the maximum arc voltage that the power supply can provide, see FIG. 2. This is typical for conventional plasmatrons.

Figure 3:
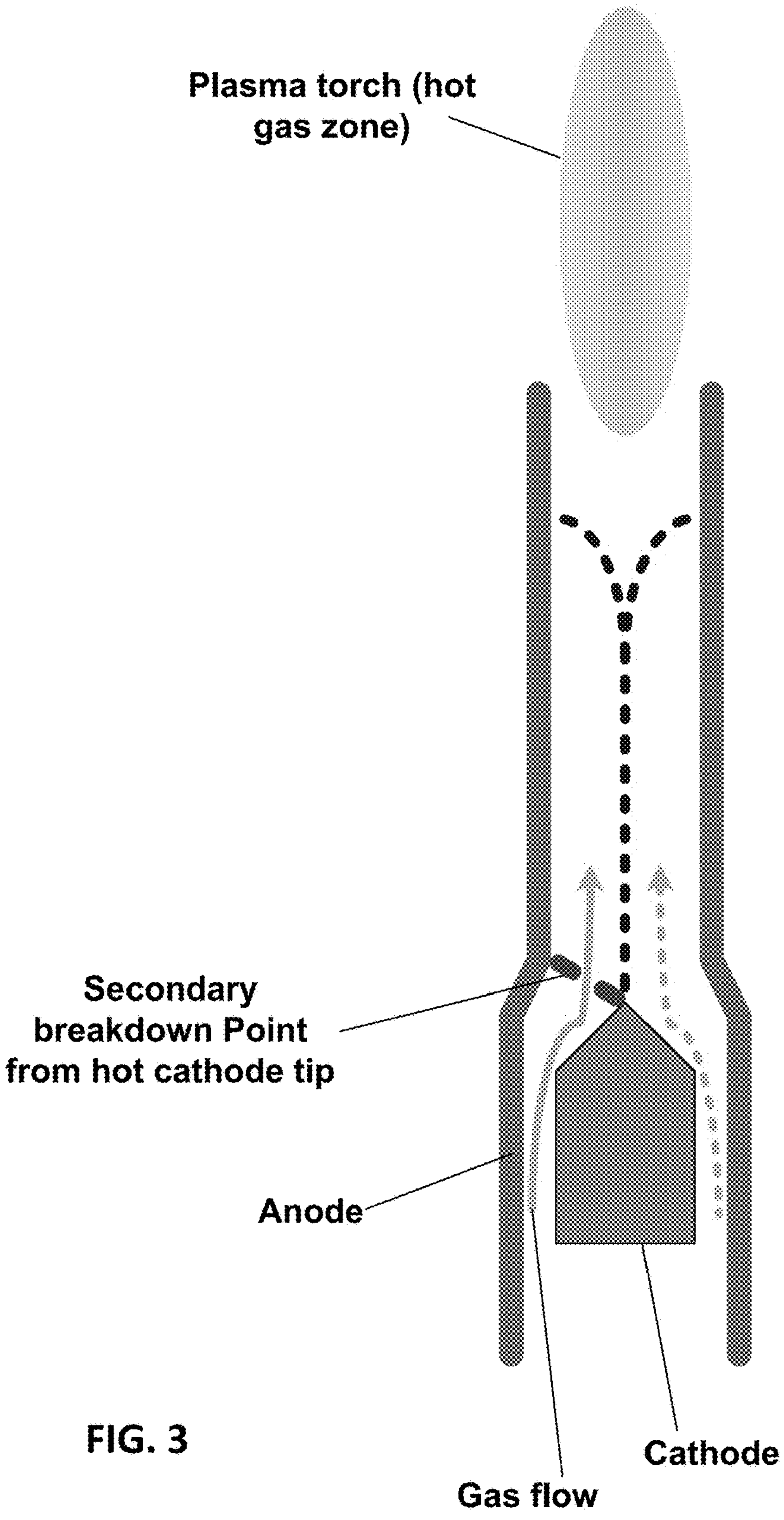
FIG. 3 illustrates place of secondary breakdown from the hot cathode tip after reaching critical voltage on an elongated arc filament.

(2) On the other hand, if the power supply can provide higher voltage, then the arc will continue stretching, and, at some point in time, the voltage can be sufficient for the secondary breakdown in the plasmatron arc channel. At this point in time, the old arc filament will be extinguished, and the arc will start evolving from the secondary breakdown point until the new secondary breakdown moment, and the process will repeat itself. Average voltage, current, and power of such an operational mode will be determined by the point of the secondary breakdown and the voltage at this moment, see FIG. 3, illustrating operation of the present invention The points of secondary breakdowns should be different compared to the point of the first breakdown, because the existence of a hot arc filament in the arc channel stimulates easier breakdown conditions at a lower voltage.

To maximally increase plasmatron operating voltage, two main changes are needed:

(1) The power supply's volt-ampere characteristic should provide for the arc existence at the desirable higher voltage; and (2) Plasmatron arc channel design should be changed to prevent secondary breakdown at a low voltage, i.e., the distance from any hot points of the arc filament and cathode tip to the anode should be increased as much as possible.

Figure 4:
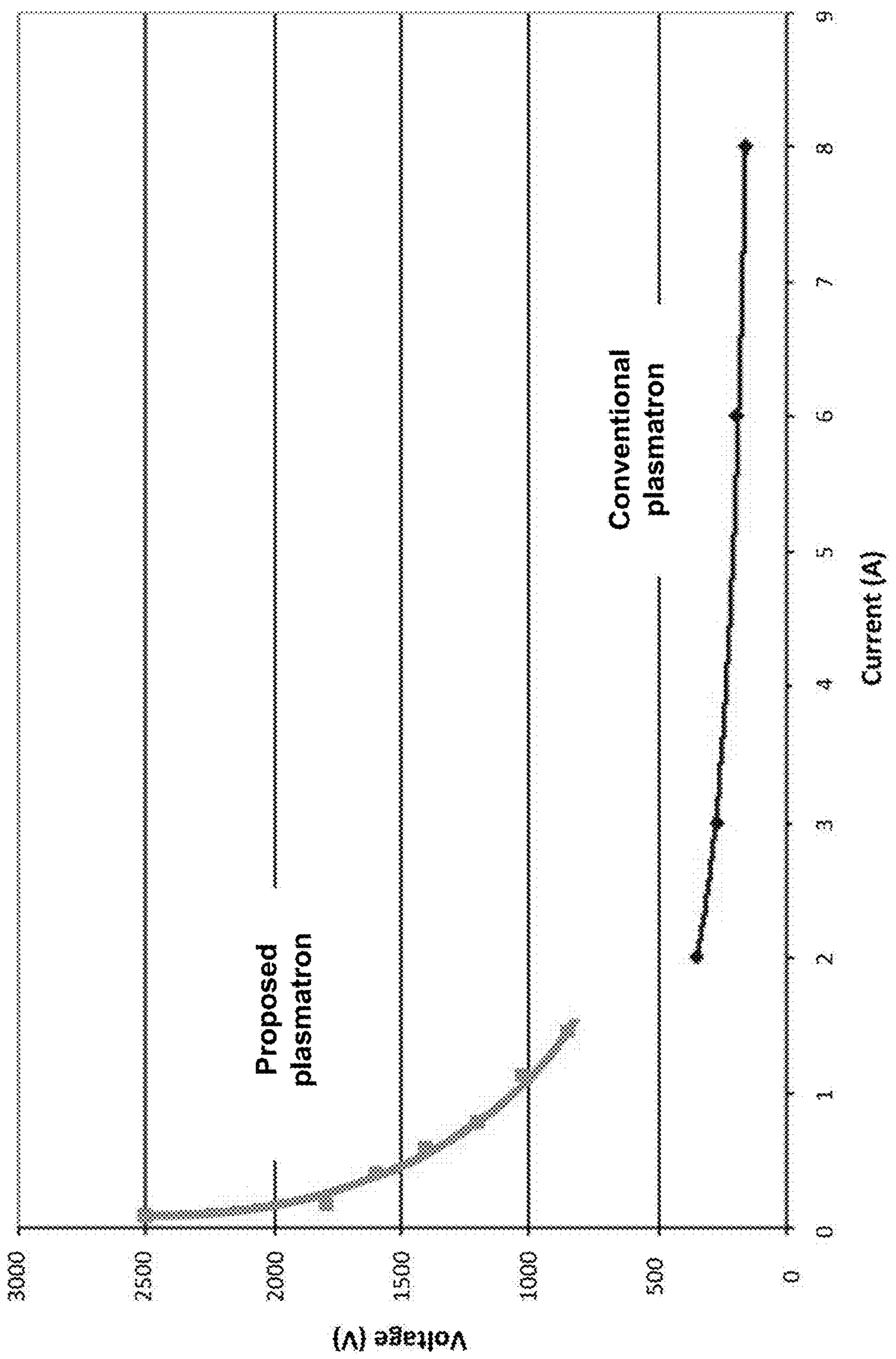
FIG. 4 illustrates volt-ampere characteristics of a conventional (right bottom) and a proposed high voltage (left, top) plasmatron.
Figure 6:
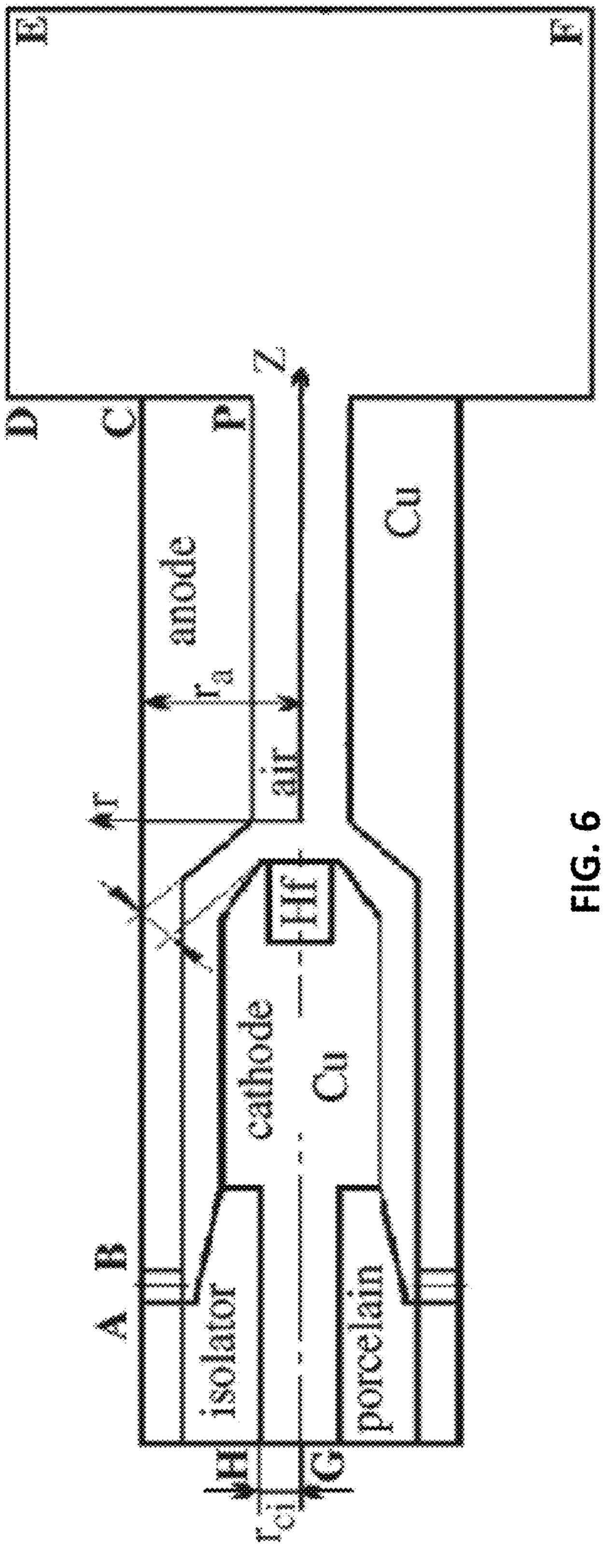
FIG. 6 CONVENTIONAL ART
FIG. 6 illustrates a conventional plasmatron design.
Figure 7:
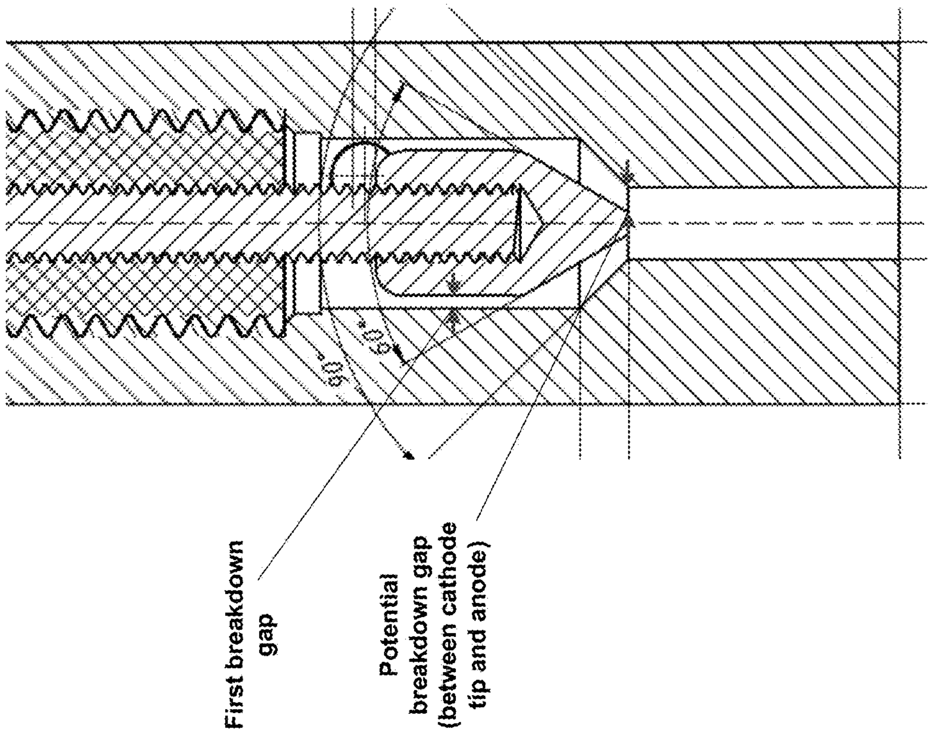
FIG. 7 illustrates a plasmatron of the proposed design.
Figure 8:
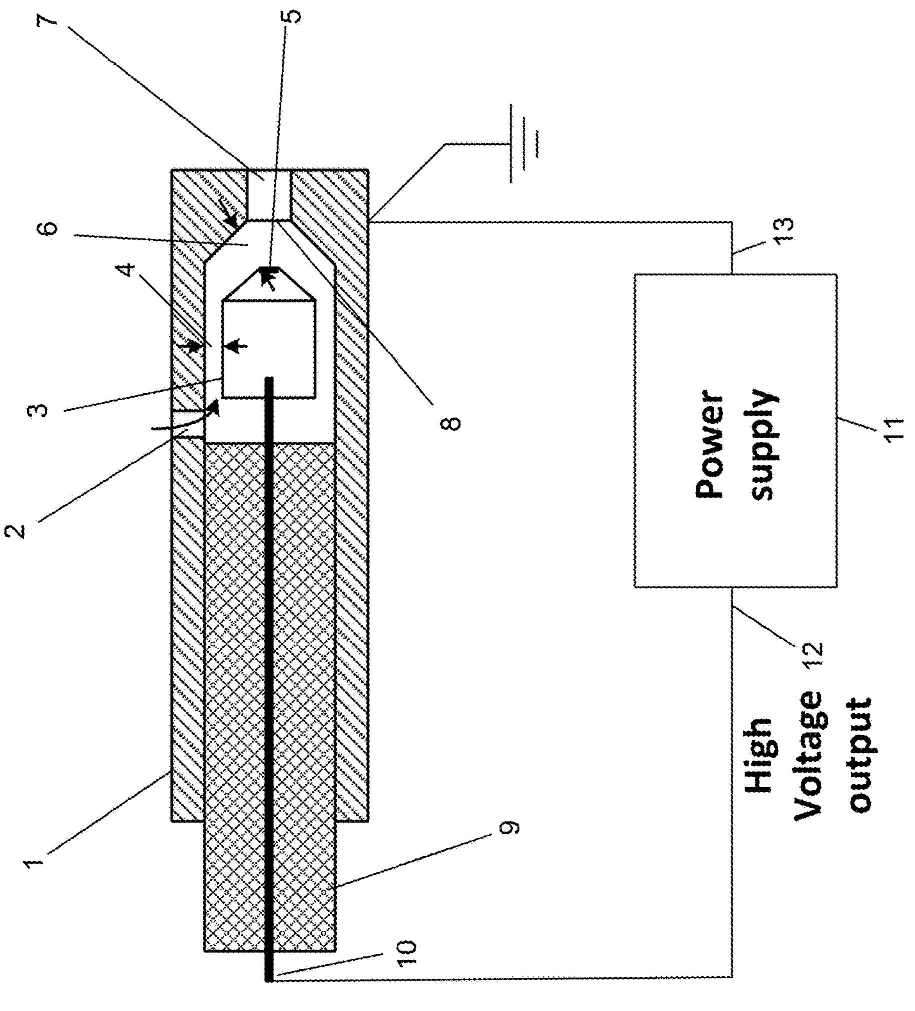
FIG. 8 illustrates changing of design of plasmatron for operation in low current high voltage mode.
Figure 9:
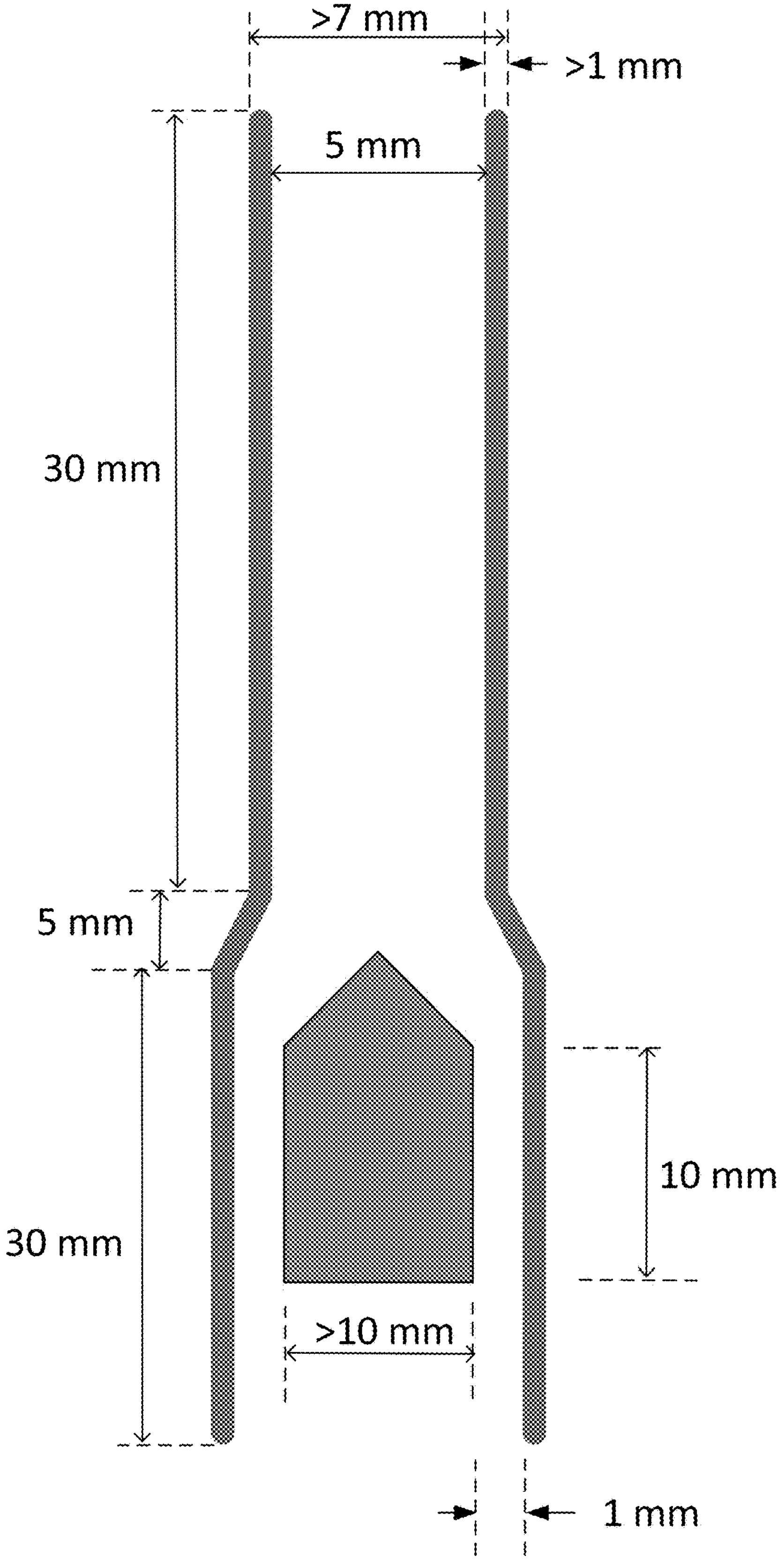
FIG. 9 illustrates exemplary dimensions of the inventive plasmatron.

A conventional plasmatron design in shown in FIG. 6. The proposed plasmatron design is shown in FIG. 7. FIG. 8 shows additional details of design of the proposed plasmatron for operation in a low current high voltage mode, and FIG. 9 illustrates exemplary dimensions of the inventive plasmatron. In FIG. 8, the following elements are shown:

1. Ground electrode (anode)
2. Gas input
3. High voltage electrode (cathode)
4. First breakdown gap
5. Cathode tip
6. Secondary breakdowns gap
7. Arc channel
8. Arc channel input
9. High voltage bushing
10. High voltage input
11. Power supply
12. High voltage output of power supply
13. Ground output of power supply The results of the proposed design according to the ideas described above are as follows. Plasmatron operation in a high voltage mode with completely different volt-ampere characteristic has been obtained, see FIG. 4, which shows volt-ampere characteristics of conventional (right bottom) and new high voltage (left, top) plasmatrons.

Figure 5:
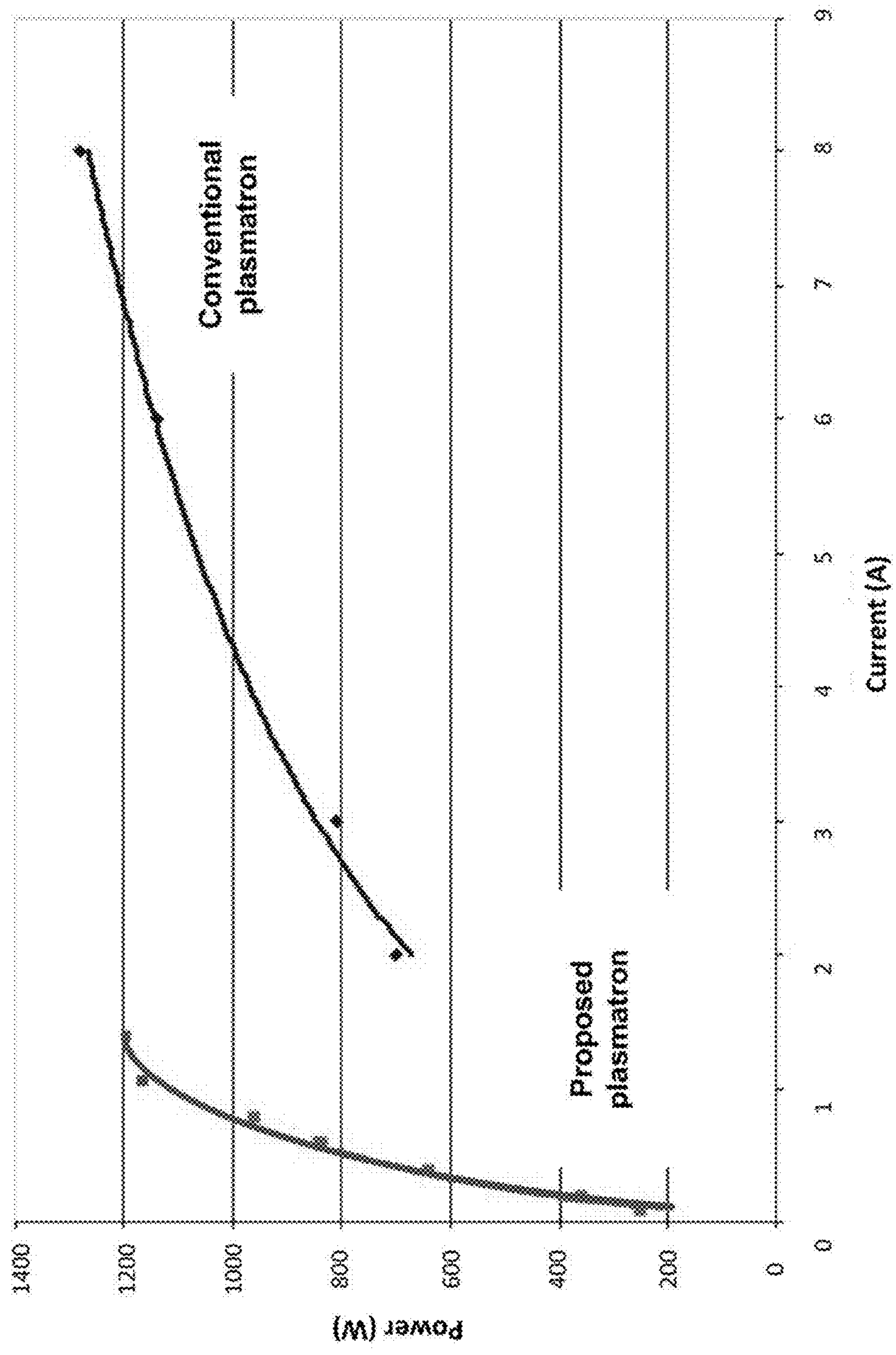
FIG. 5 illustrates output power of a conventional (right bottom) and a proposed high voltage (left, top) plasmatrons and demonstrates operation of both plasmatron types in the same power region.

The operating voltage of the new plasmatron is about ten times higher than the voltage of traditional plasmatron, and, at the same time, the current in ten times less. This way the power region of both plasmatrons is approximately the same, with the current difference tenfold. The dependence of power of both plasmatrons on the working current is shown in FIG. 5.

Both plasmatrons can work at a power of 800 W, but the current of a high voltage plasmatron is about 0.5 A, and the current of a conventional plasmatron is 3 A. Because of this, the proposed plasmatron can operate continuously for a long time (thousands of hours) without any special cooling of electrodes, but a conventional plasmatron can operate continuously for only about 30 sec—or it needs an advanced liquid cooling system. Electrodes' erosion in conventional plasmatrons is also dramatically higher (by about 100×) compared to the proposed high voltage plasmatron. The reason is the same—low operating current in the proposed design.

These results have been reached by modification of power supply and plasma channel geometry. Power supply of new high voltage plasmatron has been designed with a volt-ampere characteristics which provide for the arc voltage with more than 1 kV. This way, the plasma filament can stretch up to the high voltage and reach a mode with a secondary breakdown. To increase the voltage of the secondary breakdown mode in the plasmatron, the new design of arc channel input has been chosen. We can see that in a conventional plasmatron, the narrowest gap between cathode and anode is approximately the same as the gap between hot cathode tip and closest anode point (see FIG. 6). After the plasma channel breakdown appears, the voltage from the hot point will drop by a factor of several X, and a secondary breakdown voltage (which determines plasmatron's operating voltage in a high voltage mode) will be small. To increase operation voltage in the new design the gap between the cathode tip and anode is at least two times larger than a minimal gap between the cathode and the anode (i.e., at least twice as large as the first breakdown gap).

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

What is claimed is:

1. A plasma generation system, comprising:

an anode having a generally cylindrical proximal portion and a generally cylindrical distal portion, the distal portion having a smaller diameter than the first portion;

a connecting portion connecting the first and second portions and having walls oriented at approximately 45 degrees to a center axis of the anode;

a cathode having a generally cylindrical shape in its proximal portion and a tapering at approximately a 30 degree angle to the center axis of the anode in its distal portion, wherein a gap between the connecting portion of the anode and the distal portion of the cathode is at least twice as large as a gap between the proximal portion of the anode and the proximal portion of the cathode; and a high voltage power supply providing an operating voltage in a range of 800-2500 volts and a current of about 0.3-0.7 A to the cathode.

2. The plasma generation system of claim 1, wherein the anode and the cathode are coaxial.

3. The plasma generation system of claim 1, wherein the cathode is movable along the center axis.

4. The plasma generation system of claim 3, further comprising a screw for moving the cathode along the center axis.

5. The plasma generation system of claim 1, wherein both the cathode and the anode are made from stainless steel.

6. The plasma generation system of claim 1, wherein the cathode is made of copper with a hafnium tip.

7. The plasma generation system of claim 1, wherein the anode is made of stainless steel.

8. The plasma generation system of claim 1, wherein the cathode is made of stainless steel with a hafnium tip.

* * * * *